J. W. Foard,
House Ventilator,

№ 60,352.   Patented Dec. 11 1866.

Witnesses.
Wm. A. Darling
D. W. Taylor

Inventor.
J. W. Foard

United States Patent Office.

IMPROVEMENT IN VACUUM VENTILATORS.

J. W. FOARD, OF SAN FRANCISCO, CALIFORNIA.

Letters Patent No. 60,352, dated December 11, 1866.

The Schedule referred to in these Letters Patent and making part of the same.

TO ALL WHOM IT MAY CONCERN:

Be it known that I, J. W. FOARD, of the city and county of San Francisco, State of California, have invented a new and valuable instrument for the production of a partial vacuum, by means of a current of air being passed through it, and whereby air or water, as the case may be, may be raised as by means of a suction pump, said instrument constituting a ventilator for the ventilation of ships and other like vessels, chimneys, houses, mines, and similar things and places, as also a pump for raising water; and I hereby declare that the following is a full, clear, and exact description of the construction and operation of the same, reference being had to the annexed drawings, making part of this specification, in which, for a ventilator—

Figure 1:
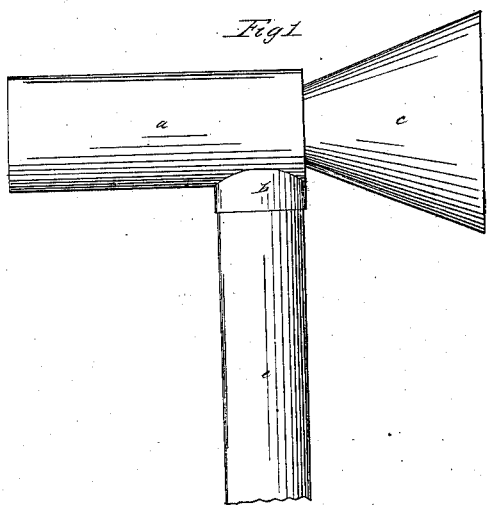
Figure 2:
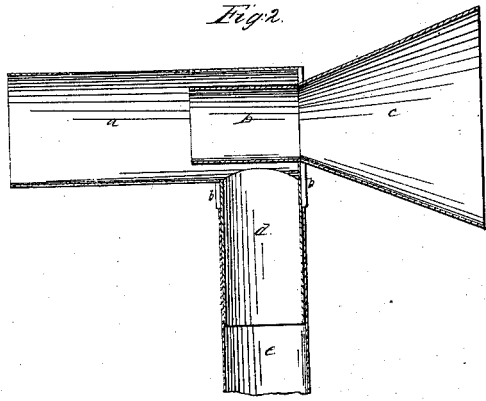
Figure 3:
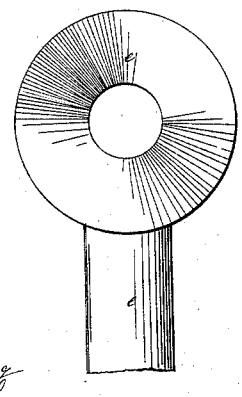

Figure 1 is a side view.
Figure 2 is a vertical section.
Figure 3 is an end view.

$a$, a pipe or flue, of any desired dimensions; $b$, a collar, resting upon the upper end of the supply-pipe; $c$, a funnel-shaped pipe inserted into pipe $a$, and extending slightly beyond the line of the supply-pipe $e$; $d$, a short pipe, attached to pipe $a$, and inserted into supply-pipe $e$, so as to fill it, yet allowing the instrument to revolve horizontally so as always to face the wind; $e$, main supply-pipe, extending down to the place or thing to be ventilated, and to act as a conduit for the air to be drawn off.

Figure 4:
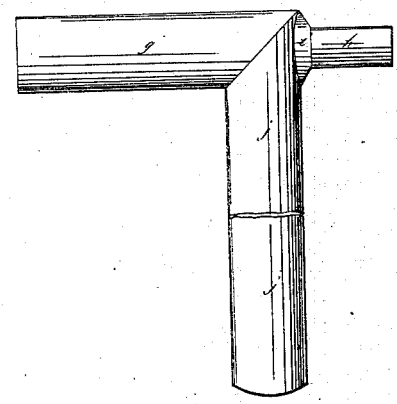
Figure 5:
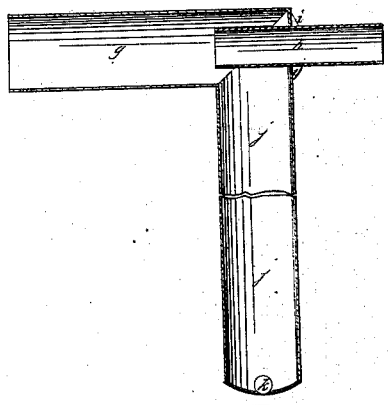
Figure 6:

Figures 4, 5, and 6, being similar views of the same thing, adapted to pumping, and by means of a current of air artificially produced, the outer end of the pipe $h$—corresponding to $c$, in the ventilator—being reduced in size, for the purpose of enabling one to produce a vacuum by simply blowing through it. $g$, being discharge pipe, similar to $a$, in figs. 1, 2, and 3; $h$, induction pipe, corresponding to $c$, in the ventilator; $i$, closed end of $g$; $j$, supply-pipe, leading to the water, and to conduct it to the pump, thence to be discharged by the current of air producing the vacuum.

Now, suppose a current of air passing through the funnel-shaped pipe $c$, of the ventilator, from the larger end; when it reaches the smaller end of the pipe, it at once expands, filling the pipe $a$, and acting as a piston in said pipe, forcing all the air therein contained forward, thereby tending to produce a vacuum at that point; but the supply-pipe, furnishing free access to the point to be ventilated, air from that point rushes forward and fills the place, thus establishing a current of air out of the place to be ventilated just so long as air shall be forced through the pipe $c$; or, in the case of a vessel propelled by the wind, so long as the wind shall blow. Again, suppose it be desired to raise water, say from a mine three hundred feet deep, I would place a pump, like that represented in the drawing, at, say, thirty feet from the bottom, another thirty feet higher, and so on to the mouth of the mine, each pump having a tank to discharge the water into; the first, or pump No. 1, to take its water from the well; No. 2 to take it from No. 1's tank; No. 3 from No. 2's tank, and so on to the surface. I would then run down a main air pipe from an air-compressing engine at the mouth of the mine, down to pump No. 1, and connecting all the pipes $h$ with it. Then suppose the compressed air to be let into the main air conduit; a vacuum is at once produced in all the pumps, No. 1 discharging a stream into its tank, No. 2 taking it thence thirty feet higher, a continuous stream flowing upwards with the same expenditure of power in the one section as in another, and in no one exceeding that requisite to lift the same amount of water from an ordinary well, thirty feet deep. In other words, the cost of raising water three hundred feet by means of my pump will be, say, ten times that of raising it thirty feet, instead of, probably, twenty or more times, as by force pumps at present in use. Again, suppose it be desired to lift water, say, thirty feet, as for ordinary domestic uses; instead of using the present form of suction pump, with its friction-producing plungers, &c., &c., I would have a small fan or blower to generate a current of air, and to be driven in the same manner as an ordinary fanning mill for cleaning grain. To the discharge pipe of the fan I would attach the induction pipe $h$, of the pump, when, by turning the crank of the fan, a stream of air would be forced through the said pipe $h$, a current of water at once flowing up through the supply-pipe $j$, and at greatly less cost of power than with the suction pump.

I do not claim raising fluids by creating a partial vacuum above them; but having described my invention, as above, I claim—

The apparatus above described, for raising fluids, gaseous or liquid, by means of natural or artificial currents of air, composed of horizontal tubes or pipes $a$ $c$, which are supported by means of the collar $b$, upon the vertical pipe $e$, so as to be free to revolve thereon, and which are guided and maintained in proper position by means of supplementary pipe $d$, that extends from pipe $a$ into said vertical pipe $e$, substantially as above shown.

J. W. FOARD.

Witnesses:
WM. A. DARLING,
D. W. TAYLOR.